(12) United States Patent
Rawlings et al.

(10) Patent No.: US 7,163,255 B2
(45) Date of Patent: Jan. 16, 2007

(54) FOLDING CONVERTIBLE TOP WITH INTEGRAL BOOT

(75) Inventors: Stephen P. Rawlings, Onsted, MI (US); Albert W. Harrison, III, Detroit, MI (US)

(73) Assignee: Dura Convertible Systems, Inc., Adrian, MI (US)

( * ) Notice: Subject to any disclaimer, the term of this patent is extended or adjusted under 35 U.S.C. 154(b) by 0 days.

(21) Appl. No.: 10/415,321

(22) PCT Filed: Oct. 20, 2001

(86) PCT No.: PCT/US01/49236

§ 371 (c)(1),
(2), (4) Date: Apr. 7, 2004

(87) PCT Pub. No.: WO02/43978

PCT Pub. Date: Jun. 6, 2002

(65) Prior Publication Data

US 2004/0232721 A1    Nov. 25, 2004

(51) Int. Cl.
*B60J 7/00* (2006.01)
(52) U.S. Cl. .................. 296/116; 296/121; 296/107.08
(58) Field of Classification Search ........... 296/107.01, 296/108, 116, 121, 107.08, 107.09, 107.15, 296/123
See application file for complete search history.

(56) References Cited

U.S. PATENT DOCUMENTS

| | | | |
|---|---|---|---|
| 505,544 A | 9/1893 | Tabor | |
| 652,090 A | 6/1900 | Daugherty et al. | |
| 1,184,734 A | 5/1916 | Freeman | |
| 1,952,252 A | 3/1934 | Heuser | |
| 2,704,225 A | 3/1955 | Anschuetz et al. | |
| 2,768,024 A | 10/1956 | Spear, Jr. | |
| 2,919,156 A | 12/1959 | Dodge | |
| 3,271,067 A | 9/1966 | Rollman | |
| 3,375,037 A | 3/1968 | Hunt, Jr. | |
| 3,473,842 A | 10/1969 | Bracey et al. | 296/116 |
| 3,536,354 A | 10/1970 | Ingram | |
| 3,655,238 A | 4/1972 | Stewart | |
| 3,666,317 A | 5/1972 | Podwys | |

(Continued)

FOREIGN PATENT DOCUMENTS

CH          650 980 A5      8/1985

(Continued)

*Primary Examiner*—Joseph D. Pape
(74) *Attorney, Agent, or Firm*—Brinks Hofer Gilson & Lione (57) ABSTRACT

A pair of side linkages for raising a convertible top (10) between a raised position, covering the vehicle body passenger compartment, through a body opening, and a lowered position folded into a storage compartment within the vehicle body, said top including a header (12) for engaging the vehicle windshield in the top raised position and at least one crossbow (14) extending between the side linkages, each linkage comprising side rails (18, 22) pivoted to and extending rearwardly from the header, and a plurality of links (34, 50, 56, 62) forming 4-bar linkages connecting the header (12), side rails (18, 22) and vehicle body for folding the top (10) in a Z-shaped folding action to a compact shape in the storage compartment such that the header (12) is not inverted and covers the folded top (10) and closes the body opening.

19 Claims, 7 Drawing Sheets

U.S. PATENT DOCUMENTS

| | | |
|---|---|---|
| 3,690,722 A | 9/1972 | Bakewicz et al. |
| 3,823,977 A | 7/1974 | Fioravanti |
| 3,910,628 A | 10/1975 | Nantau |
| 3,917,337 A | 11/1975 | Couix |
| 3,994,524 A | 11/1976 | Lehmann |
| 4,286,821 A | 9/1981 | Cooper |
| 4,289,347 A | 9/1981 | Holzwarth |
| 4,346,930 A | 8/1982 | Northey |
| 4,487,447 A | 12/1984 | Schroder |
| 4,516,803 A | 5/1985 | Kaltz et al. |
| 4,553,784 A | 11/1985 | Trenkler |
| 4,621,861 A | 11/1986 | Scaduto |
| 4,626,020 A | 12/1986 | Kaltz et al. |
| 4,626,021 A | 12/1986 | Muscat |
| 4,693,509 A | 9/1987 | Moy et al. |
| 4,695,089 A | 9/1987 | Fukutomi et al. |
| 4,711,485 A | 12/1987 | Maebayashi et al. |
| 4,712,828 A | 12/1987 | Albrecht |
| 4,720,133 A | 1/1988 | Alexander et al. |
| 4,776,630 A | 10/1988 | Fukutomi et al. |
| 4,819,982 A | 4/1989 | Eyb |
| 4,842,327 A | 6/1989 | Hennessy |
| 4,854,634 A | 8/1989 | Shiraishi et al. |
| 4,895,409 A | 1/1990 | Konishi et al. |
| 4,915,443 A | 4/1990 | Uerlings et al. |
| 4,917,432 A | 4/1990 | Schrader et al. |
| 4,929,015 A | 5/1990 | Bauer |
| 4,948,194 A | 8/1990 | Dogliani |
| 4,950,022 A | 8/1990 | Pattee |
| 4,958,882 A | 9/1990 | Kolb |
| 4,964,668 A | 10/1990 | Hofmann |
| 4,969,679 A | 11/1990 | Eyb |
| 4,984,841 A | 1/1991 | Bauer et al. |
| 4,991,902 A | 2/1991 | Schrader et al. |
| 4,991,903 A | 2/1991 | Okabe et al. |
| 5,026,110 A | 6/1991 | Koop et al. |
| 5,029,932 A | 7/1991 | Parr |
| 5,078,447 A | 1/1992 | Klein et al. |
| 5,096,251 A | 3/1992 | Pfertner et al. |
| 5,154,479 A | 10/1992 | Sautter, Jr. |
| 5,207,474 A | 5/1993 | Licher et al. ............... 296/107 |
| 5,320,400 A | 6/1994 | Orth et al. |
| 5,335,959 A | 8/1994 | Schrader et al. |
| 5,429,409 A | 7/1995 | Corder et al. |
| 5,593,202 A | 1/1997 | Corder et al. |
| 5,743,587 A | 4/1998 | Alexander et al. |
| 5,810,422 A | 9/1998 | Corder et al. |
| D406,792 S | 3/1999 | Alexander et al. |
| D427,138 S | 6/2000 | Alexander et al. |
| 6,207,143 B1 | 3/2001 | Lezdey et al. |
| D442,541 S | 5/2001 | Alexander et al. |
| 6,270,143 B1 | 8/2001 | Heselhaus et al. |
| D452,675 S | 1/2002 | Alexander et al. |
| 6,343,829 B1 | 2/2002 | Busch ................... 296/107.15 |
| 6,416,111 B1 * | 7/2002 | Neubrand ............. 296/107.09 |
| D464,605 S | 10/2002 | Alexander et al. |
| 6,692,061 B1 * | 2/2004 | Willard ..................... 296/116 |
| RE38,546 E | 7/2004 | Corder et al. |
| 6,796,595 B1 * | 9/2004 | Doncov ................. 296/107.09 |
| 2001/0040385 A1 | 11/2001 | Obendiek .................. 296/108 |
| 2002/0030381 A1 | 3/2002 | Schutt et al. .............. 296/108 |
| 2004/0232721 A1 | 11/2004 | Rawlings et al. |

FOREIGN PATENT DOCUMENTS

| | | |
|---|---|---|
| DE | 341652 | 10/1921 |
| DE | 464 440 | 8/1928 |
| DE | 629 252 | 4/1936 |
| DE | 646381 | 6/1937 |
| DE | 685 137 | 12/1939 |
| DE | 733757 | 4/1943 |
| DE | 885 356 | 8/1953 |
| DE | 756531 | 9/1956 |
| DE | 978638 | 12/1964 |
| DE | 31 27 525 A1 | 1/1983 |
| DE | 34 16 286 A1 | 4/1984 |
| DE | 3416286 A1 | 10/1984 |
| DE | 33 28 294 A1 | 2/1985 |
| DE | 3328294 A1 | 2/1985 |
| DE | 35 26 694 A1 | 12/1987 |
| DE | 38 09 197 A1 | 9/1989 |
| DE | 39 03 358 A1 | 8/1990 |
| DE | 44 38 191 C1 | 7/1995 |
| JP | 2-164615 | 6/1990 |
| JP | 2-306822 | 12/1990 |
| JP | 5-185844 | 7/1993 |
| JP | 6-226118 | 8/1994 |
| JP | 6-239322 | 8/1994 |
| JP | 62-31515 | 8/1994 |
| JP | 62-31516 | 8/1994 |

* cited by examiner

FOLDING CONVERTIBLE TOP WITH INTEGRAL BOOT

TECHNICAL FIELD

This invention relates to vehicle convertible tops and, more particularly, to a top having a linkage which folds a top so that the header serves as a boot to cover the top when stored.

BACKGROUND OF THE INVENTION

Many different types of folding convertible soft and hard tops have been developed to enhance motoring pleasure by enabling a driver to selectively open and close the passenger compartment. These tops utilize a variety of different folding linkages, each of which are designed to accommodate the particular mechanical constraints of a specific vehicle application. It is desirable to utilize a top folding linkage that is simple, compact and stores the top in as little space as possible.

When these tops are lowered into a storage compartment, the header is normally inverted. This requires that the top or a portion of the top to be covered by a soft or hard boot to prevent accumulation of dust or other contaminants that would be dumped into the passenger compartment when the header rotates as the top is raised. The boot may be manually installed, or, is automatically manipulated by power operators, usually hydraulic cylinders. Installation of these boots requires time and/or effort to install. In the case of the soft boot, it requires separate storage when removed to enable the top to be raised.

It would be desirable to provide a convertible top that does not require a separate boot to close the top storage compartment, and incorporates a linkage, which stores the top in a compact configuration, with the outer surface of the header covering the remainder of the stored and folded top.

SUMMARY OF THE INVENTION

It is therefore an object of this invention to provide a convertible top that does not require a separate boot to close the top storage compartment, and incorporates a linkage, which stores the top in a compact configuration, with the exterior of the header covering the remainder of the stored and folded top.

Accordingly, this invention features a convertible top and a pair of side linkages for raising the top between a raised position, covering the vehicle body passenger compartment, through a body opening, and a lowered position folded into a storage compartment within the vehicle body. The top includes a cover, a header for engaging the vehicle windshield in top raised position, and at least one crossbow extending between the side linkages to support the cover in top raised position. Each side linkage includes a side rail pivoted to and extending rearwardly from the header and other links for folding the top in a Z-shaped folding action to a compact shape in the storage compartment such that the header is not inverted and covers the folded top and closes the body opening.

This invention also features 4-bar side linkages that enable the top to fold in the Z-shape.

Another feature of this invention is the use of a lost-motion connection between the header and a side rail to enable relative lateral movement during raising and lowering of the top.

These and other objects and features of this invention will become more readily apparent upon reference to the following detailed description of a preferred embodiment, as illustrated in the accompanying drawings, in which:

DESCRIPTION OF THE PREFERRED EMBODIMENT

Referring now to the drawings, a convertible top 10 has a conventional flexible fabric, or other similar material, cover (not illustrated) that is supported at its front by a plate-like extended header, or 1-bow, 12, and an intermediate bow 14. The cover for top 10 is conventionally attached to the vehicle body (not illustrated). Header 12 extends sufficiently rearward so as to incorporate what would normally be an intermediate 2-bow.

Figure 1:
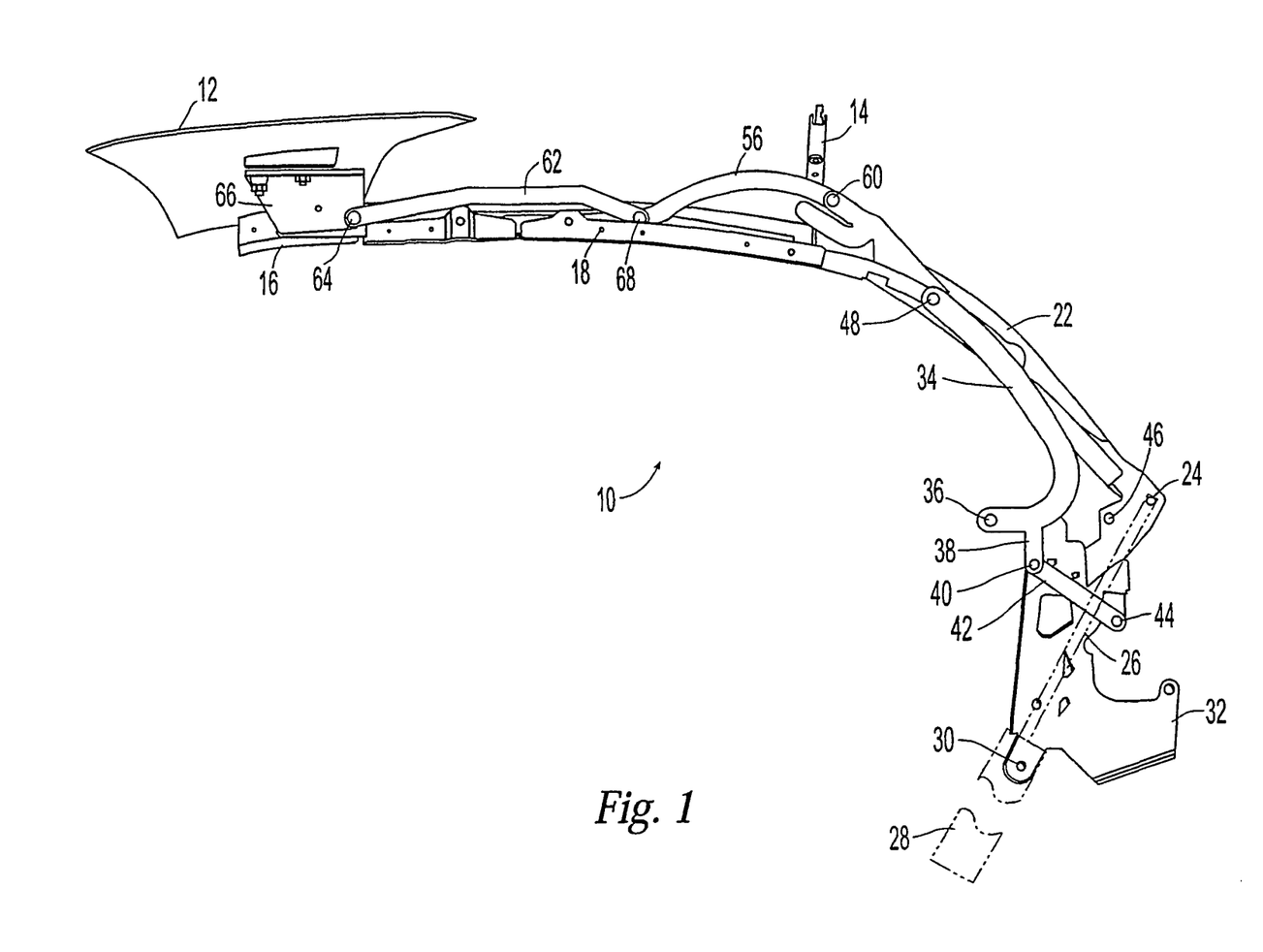
FIGS. 1, 2, 3 and 4 are side views of a convertible top of this invention, sequentially shown in fully raised, ¾ raised, half raised, and fully lowered and stored position.
Figure 2:
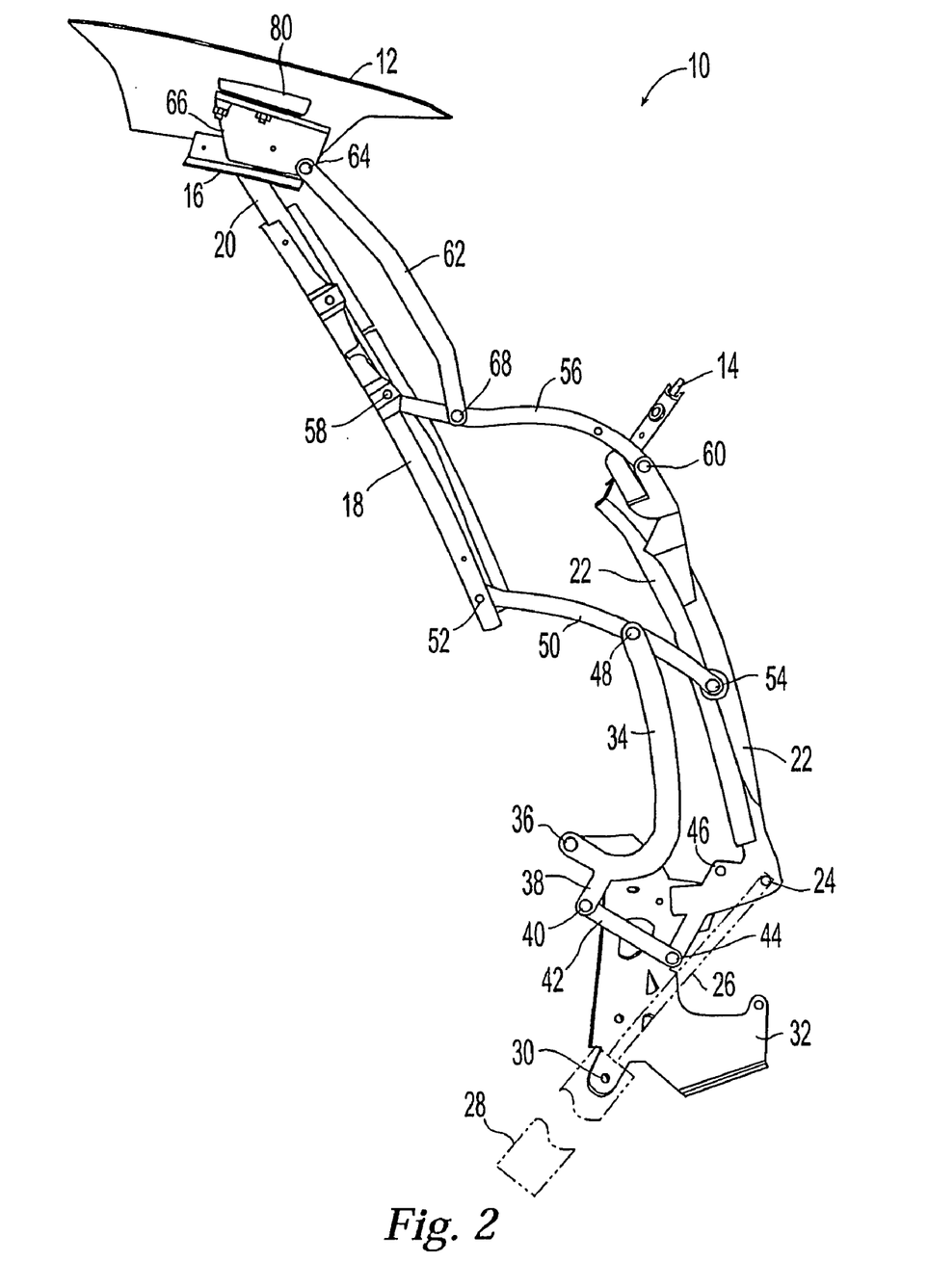
Figure 3:
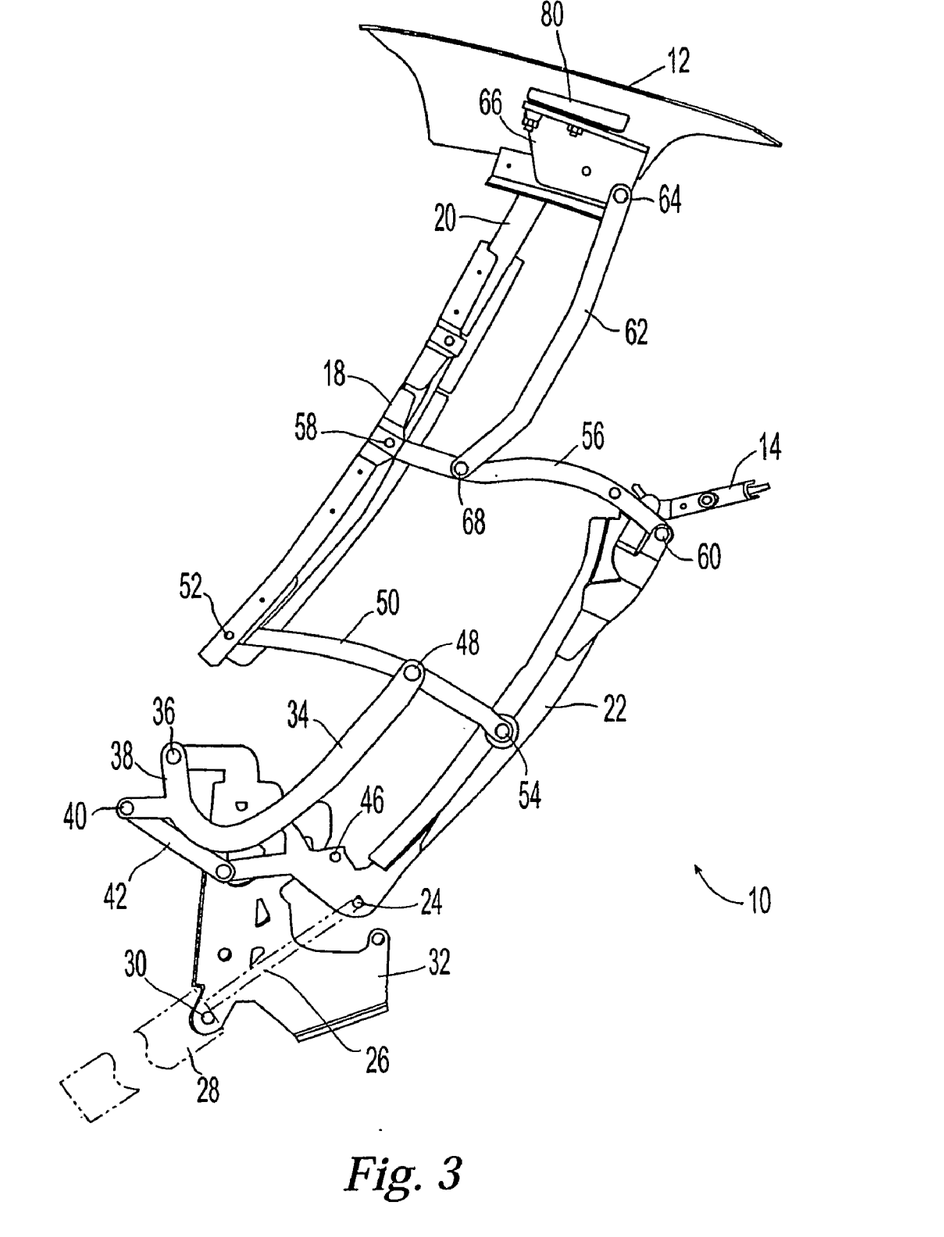
Figure 4:
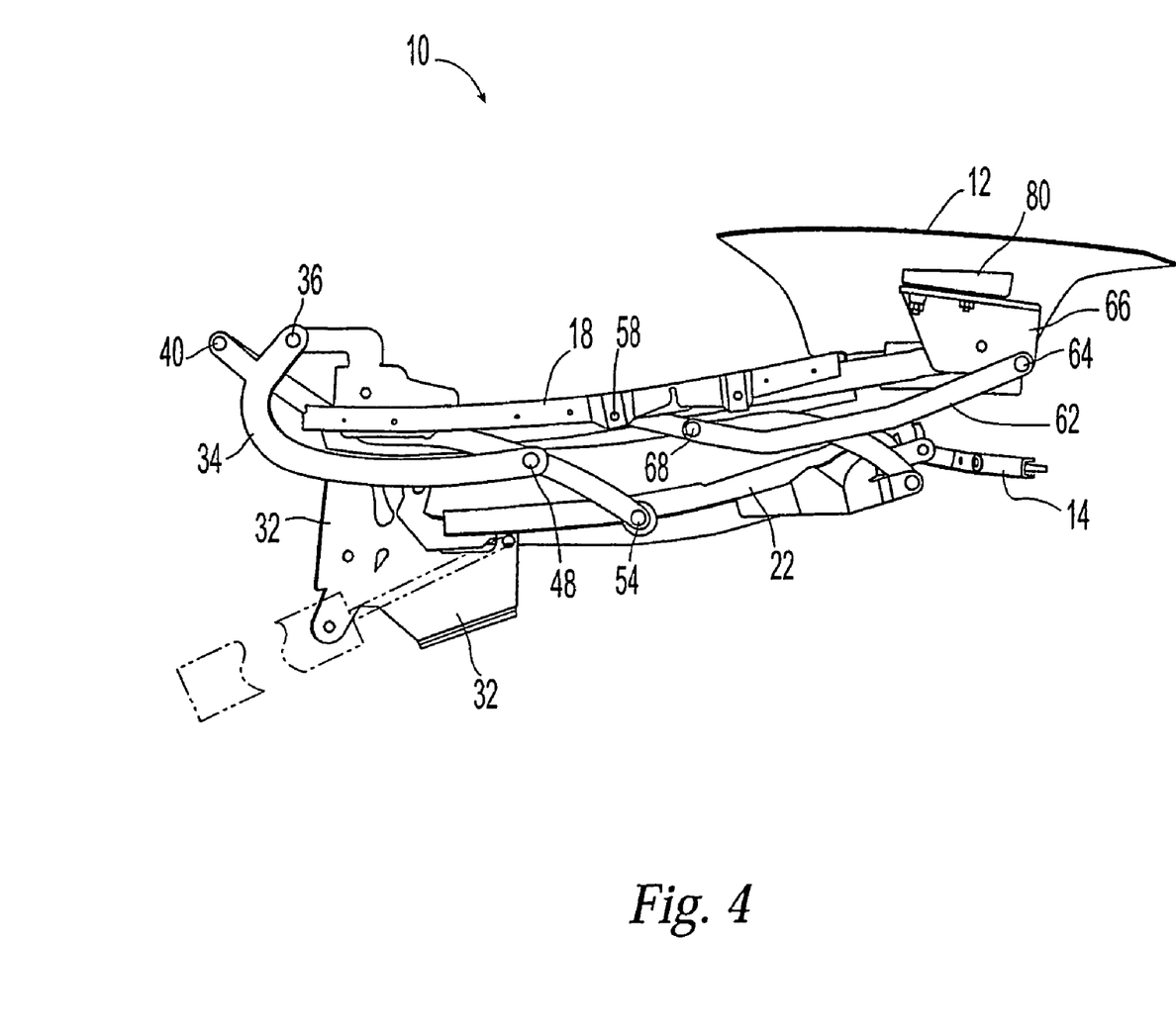
Figure 5:
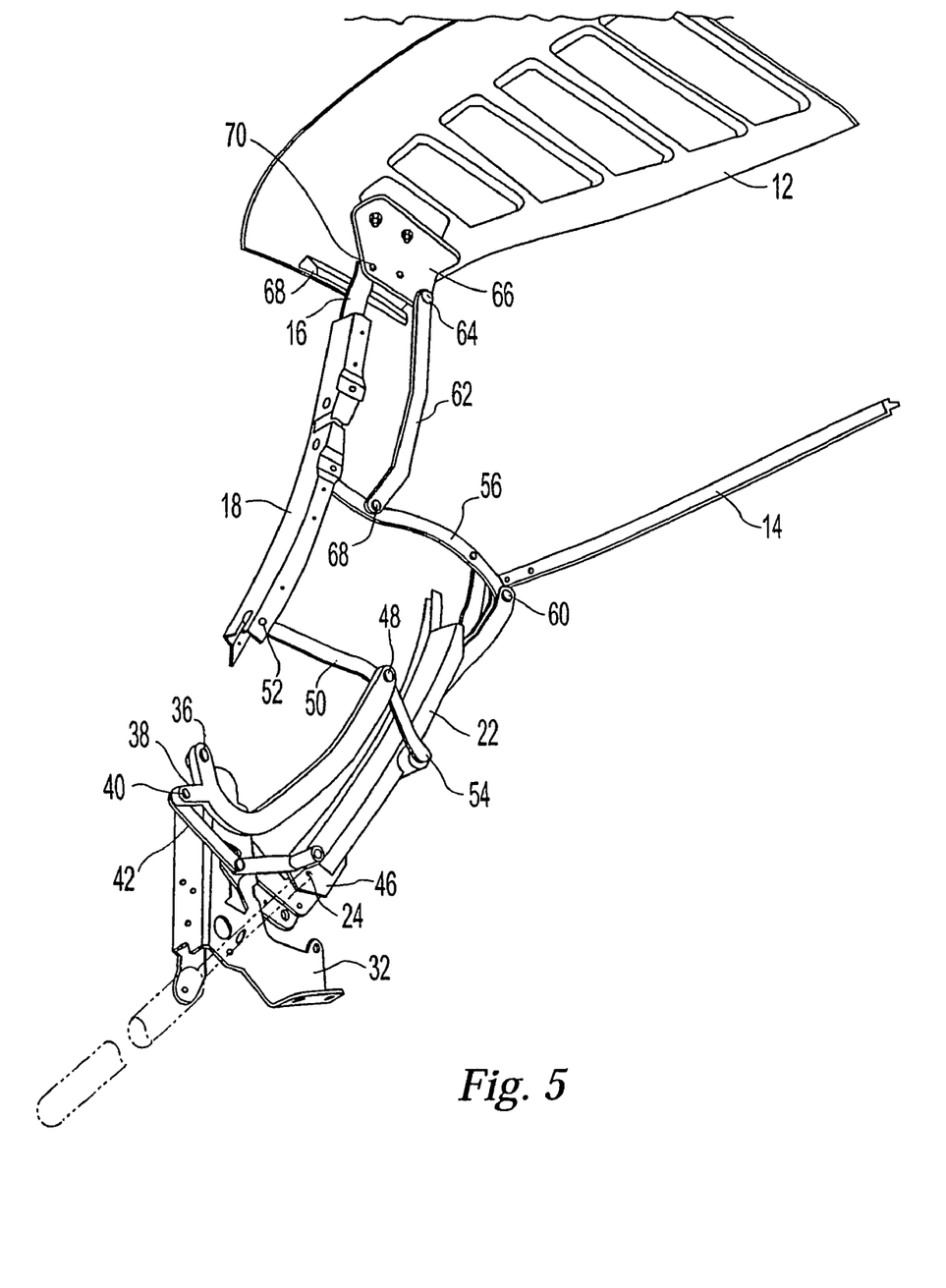
FIG. 5 is a perspective view of the top in its FIG. 3 position.

These supporting bows are pivotally connected at each side by an articulated linkage, which is conventionally operable by hydraulic cylinders, or other means (not shown) to raise and lower the top between an extended raised position covering the vehicle passenger compartment (not illustrated), as shown in FIG. 1, through the intermediate positions shown in FIGS. 2, 3 and 5, and a lowered and folded position, as shown in FIG. 4, within a storage compartment in a vehicle body (not illustrated).

Only one articulated side linkage is illustrated, since both are identical/symmetrical. The linkages comprise a front rail 16 that is secured to, and moves with header 12. A middle rail 18 has a forward extension 20 that is connected to front rail 16, as will be later described. A rear rail 22 is pivoted adjacent its lower end at 24 to the rod 26 of a hydraulic cylinder 28, which is pivoted at 30 to a body-mounted mounting bracket 32.

A lower control arm 34 is pivoted to bracket 32 at 36 and has an arm 38 that pivotally mounts one end 40 of a lower connecting link 42 that is pivoted at its other end 44 to the lower end 46 of rear rail 22. The upper end of lower control arm 34 is pivoted at 48 intermediate the ends of a middle connecting link 50 that has one end pivoted at 52 to middle rail 18 and its other end pivoted at 54 to an intermediate portion of rear rail 22.

The upper end of an upper connecting link 56 is pivoted at 58 to an intermediate portion of middle side rail 18, while its other end is pivoted to the upper end of rear rail 22 at 60. An upper control arm 62 is pivoted at 64 to a header-mounted bracket 66, and to an intermediate portion of upper connecting link 56 at 68.

The linkage just described, of course, is duplicated on the other side of the vehicle. It comprises three four-bar linkages that allow the top 10 to fold into a very compact, layered arrangement. As can be seen from viewing the folding sequence illustrated in FIGS. 1, 2, 3 and 4, top 10 folds into the form of a collapsed "Z". This is enabled by employing the four-bar linkages. The first linkage is formed by header 12, front rail 20, upper control arm 62 and the upper portion of upper connecting link 56, as defined by pivots 64, 68, 58 and the connection 70 between extension 20 of middle rail 18 and front rail 16.

The second four-bar linkage comprises upper connecting link 56, the lower portion of middle rail 18, middle connecting link 50 and the upper portion of rear rail 22, as defined by pivots 58, 52, 54 and 60. The third four-bar linkage is formed by the lower portion of middle connecting link 50, lower control arm 34, lower connecting link 42 and the lower portion of rear rail 22, as defined by pivots 48, 40, 44 and 54.

Thus, the entire top 10 moves about body linkage pivot 36 and cylinder pivot 30, as controlled by cylinder 28 and the three four-bar linkages described above. This Z-fold provides a more compact arrangement requiring less space within the vehicle body than prior arrangements, while also enabling the extended header to cover the folded top and eliminate the necessity of using a separate boot cover.

Figure 6:
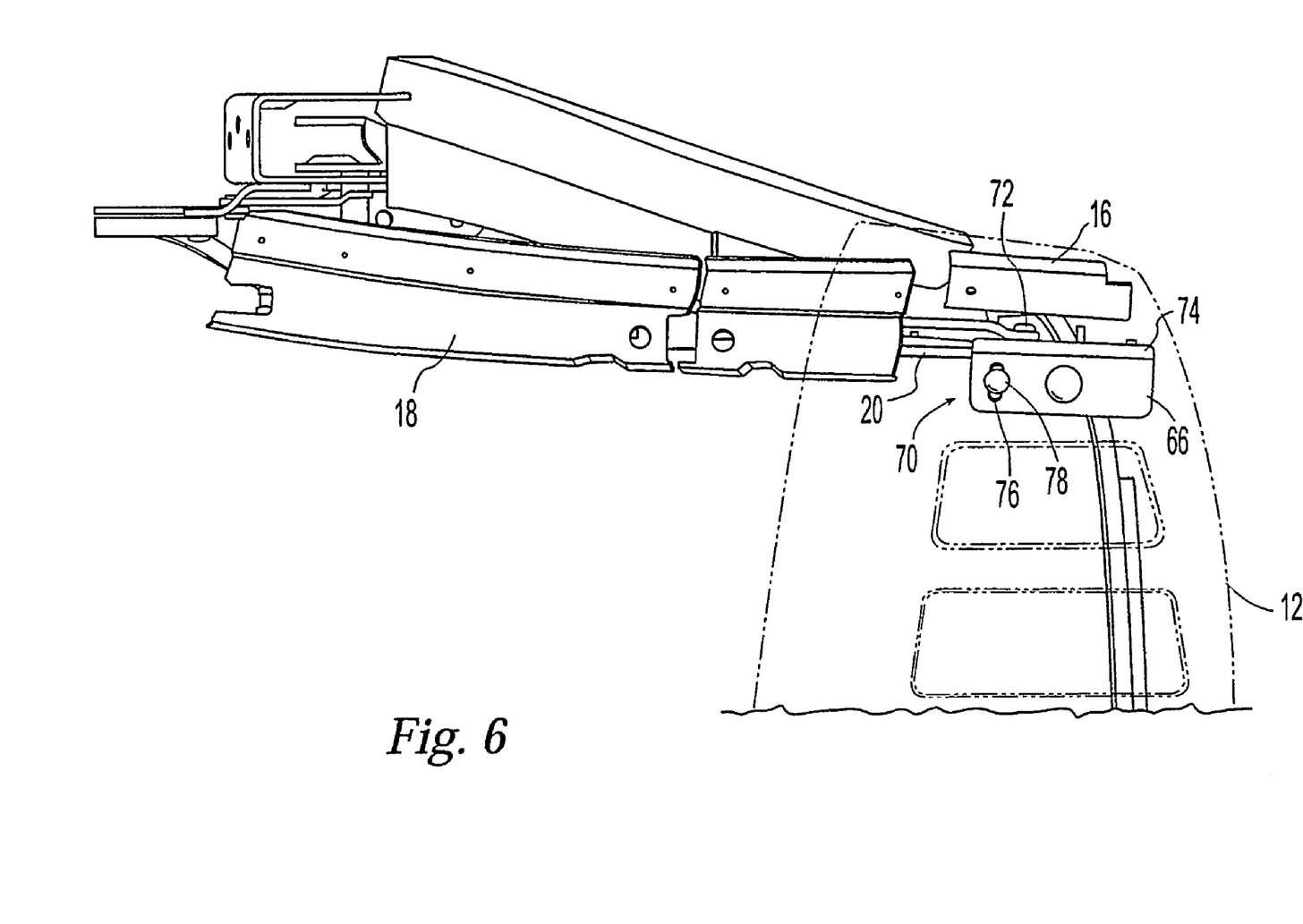
FIG. 6 an enlarged bottom detail view of the juncture of the header and the front side rail.
Figure 7:
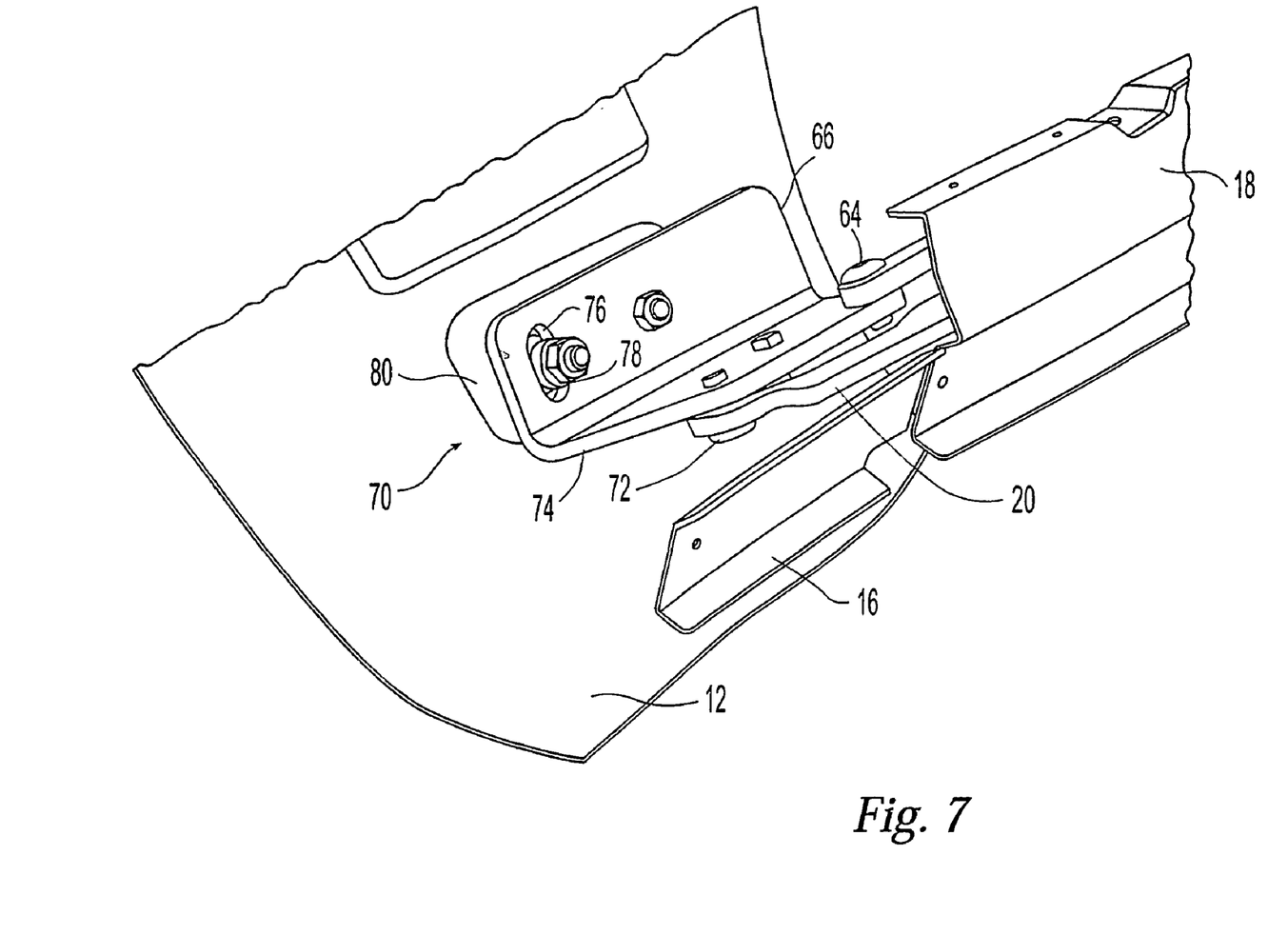
FIG. 7 is an enlarged bottom view of a portion of FIG. 6, illustrating the flexible connection between the front side rail and the header.

To enable this linear Z-type folding movement of top 10, accommodation must be made for lateral movement of the side linkage relative to the header. The mechanism 70 for enabling this lateral flexibility is shown in FIGS. 6 and 7. Middle rail extension 20 is pivoted at 72 to one flange 74 of bracket 66. The other bracket flange contains an elongated slot 76, which receives a stud 78 mounted on a pad 80 on header 12. The lost motion connection 70 causes the middle rail 18 and the remainder of the side linkages to move both pivotally and laterally with respect to the header 12. This movement enables the top 10 to fold in the above-described manner.

While only a preferred embodiment has been described and shown, obvious modifications are contemplated within the scope of this invention, as defined by the following claims.

We claim:

1. A convertible top for a vehicle, the vehicle having a storage compartment, the top comprising:
   a header;
   a pair of side linkages connected with the header;
   at least one crossbow extending between and connected with the side linkages;
   wherein the side linkages comprise:
      a front rail;
      a middle rail;
      a rear rail;
   a lost motion connection between the side linkages and the header to enable relative lateral movement of the side linkages during folding and unfolding of the top; and
   wherein the top is foldable into a Z-shape into the storage compartment such that the header is not inverted, the header substantially covers the top, and the header substantially closes the storage compartment and wherein the middle and rear rails are inverted during folding of the top.

2. The convertible top of claim 1, wherein the side linkages include a 4-bar linkage to enable the Z-shaped fold.

3. The convertible top of claim 2, wherein the side linkages include a first side rail mounted on the header, a second side rail pivoted to the header, a third side rail pivotally connected to the vehicle and spaced upper and middle connecting links interconnecting the second and third side rails to form the 4-bar linkage.

4. The convertible top of claim 3, further including a lost motion connection between the second side rail and the header to enable lateral movement during folding and unfolding of the top.

5. The convertible top of claim 3, wherein the side linkages include an upper control arm interconnecting the upper connecting link and the header to form a second 4-bar linkage.

6. The convertible top of claim 5, wherein the side linkages include a lower control arm connecting the middle connecting link and the vehicle and a lower connecting link connecting the third side rail and the lower control arm to form a third 4-bar linkage.

7. The convertible top of claim 1, wherein the side linkages include two 4-bar linkages to enable the Z-folding action.

8. The convertible top of claim 7, wherein the side linkages include three 4-bar linkages.

9. The convertible top of claim 1 further comprising a plurality of links connecting the header, the front rail, the middle rail, the rear rail, and the crossbows.

10. A convertible top for a vehicle, the vehicle having a storage compartment, the top comprising:
    a header;
    a pair of side linkages connected with the header, the side linkages comprising a plurality of side rails;
    at least one crossbow extending between and connected with the side linkages;
    a lost motion connection between one of the side rails and the header so as to enable lateral movement of the side linkages during folding and unfolding of the top; and
    wherein the top is foldable into a Z-shape into the storage compartment such that the header is not inverted, the header substantially covers the top, and the header substantially closes the storage compartment.

11. The convertible top of claim 10, wherein the side linkages include a 4-bar linkage to enable the Z-shaped fold.

12. The convertible top of claim 11, wherein the side linkages include two 4-bar linkages to enable the Z-folding action.

13. The convertible top of claim 12, wherein the side linkages include three 4-bar linkages.

14. The convertible top of claim 10, wherein the side linkages include a first side rail mounted on the header, a second side rail pivoted to the header, a third side rail pivotally connected to the vehicle and spaced upper and middle connecting links interconnecting the second and third side rails to form the 4-bar linkage.

15. The convertible top of claim 14, wherein the side linkages include an upper control arm interconnecting the upper connecting link and the header to form a second 4-bar linkage.

16. The convertible top of claim 15, wherein the side linkages include a lower control arm connecting the middle connecting link and the vehicle body and a lower connecting link connecting the third side rail and the lower control arm to form a third 4-bar linkage.

17. The convertible top of claim 10, wherein the side linkages comprise a front rail, a middle rail, and a rear rail.

18. The convertible top of claim 17, wherein the middle and rear rails are inverted during folding of the top.

19. A convertible top for a vehicle, the vehicle having a storage compartment, the top comprising:
    a header;
    a pair of side linkages connected with the header;
    at least one crossbow extending between and connected with the side linkages;

a lost motion connection between one of the side rails and the header so as to enable lateral movement of the side linkages during folding and unfolding of the top; and wherein the top is foldable into a Z-shape into the storage compartment such that the header is not inverted, the header substantially covers the top, and the header substantially closes the storage compartment.

* * * * *